(12) United States Patent
Meyer et al.

(10) Patent No.: US 6,577,645 B2
(45) Date of Patent: Jun. 10, 2003

(54) METHOD AND RADIO SET FOR TRANSMITTING MESSAGES

(75) Inventors: Jan Meyer, Weilheim (DE); Wen Xu, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/729,057

(22) Filed: Dec. 4, 2000

(65) Prior Publication Data

US 2001/0002911 A1 Jun. 7, 2001

Related U.S. Application Data

(63) Continuation of application No. PCT/DE99/01615, filed on Jun. 1, 1999.

(30) Foreign Application Priority Data

Jun. 3, 1998 (DE) .......................... 198 24 782

(51) Int. Cl.⁷ .................................. H04J 3/16
(52) U.S. Cl. .................. 370/468; 370/473; 370/523
(58) Field of Search ................ 370/468, 465, 370/473, 470, 472, 484, 487, 509, 514, 282, 336, 337, 347, 328, 522, 235, 442, 458, 320, 321, 324, 326, 350, 523; 455/450; 375/231

(56) References Cited

U.S. PATENT DOCUMENTS

| | | | | |
|---|---|---|---|---|
| 5,471,500 A | * | 11/1995 | Blanker et al. | 375/340 |
| 5,499,246 A | | 3/1996 | Cooper | 370/522 |
| 5,550,870 A | * | 8/1996 | Blanker et al. | 375/341 |
| 5,568,483 A | | 10/1996 | Padovani et al. | 370/468 |
| 5,657,420 A | | 8/1997 | Jacobs et al. | 704/223 |
| 5,724,390 A | * | 3/1998 | Blanker et al. | 375/229 |
| 5,729,558 A | * | 3/1998 | Mobin | 714/795 |
| 5,872,801 A | * | 2/1999 | Mobin | 714/795 |
| 5,905,733 A | * | 5/1999 | Solve et al. | 370/522 |
| 6,295,455 B1 | * | 9/2001 | Fischer et al. | 455/456 |

FOREIGN PATENT DOCUMENTS

WO    WO 97/38540    10/1997

* cited by examiner

Primary Examiner—Chau Nguyen
Assistant Examiner—Brian Nguyen
(74) Attorney, Agent, or Firm—Laurence A. Greenberg; Werner H. Stemer; Ralph E. Locher

(57) ABSTRACT

A method for transmitting messages is described which is based on the idea of using bit groups of a data packet, which are not required for assigning the bit groups to a specific logic channel, for transmitting a type of information specific to the bit group for the purpose of transmitting a different type of information. In particular new signaling information, the importance of which could not yet have been recognized when the data packets or the bit group structure thereof was being defined, or the transmission of which was not yet regarded as necessary when laying down the transmission standard.

7 Claims, 3 Drawing Sheets

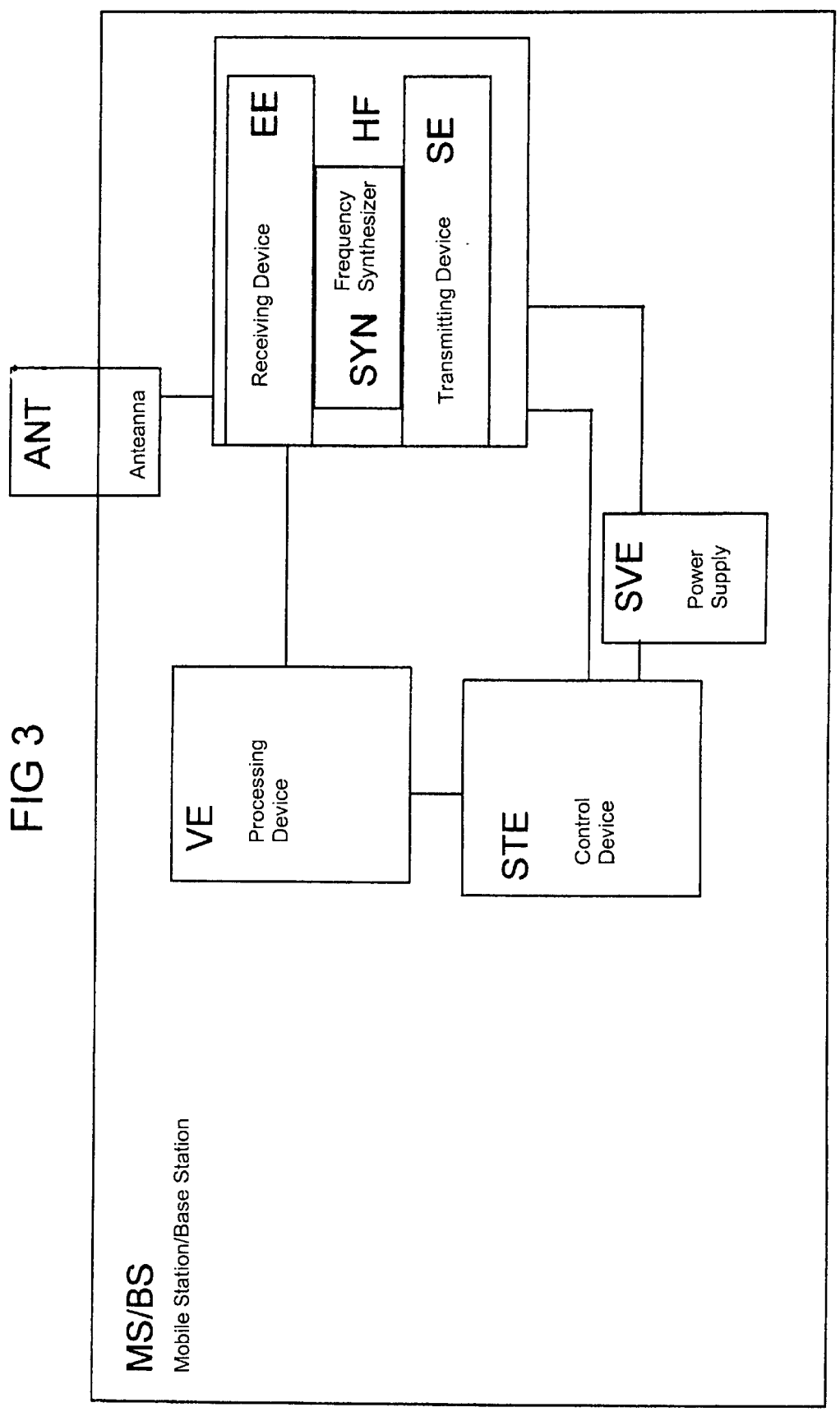

METHOD AND RADIO SET FOR TRANSMITTING MESSAGES

CROSS-REFERENCE TO RELATED APPLICATION

This is a continuation of copending International Application PCT/DE99/01615, filed Jun. 1, 1999, which designated the United States.

BACKGROUND OF THE INVENTION

Field of the Invention

The invention relates to a method and a radio set for transmitting messages over a communication network, in particular over a mobile radio system, and to a control device for controlling the transmission.

In order to ensure the most flexible and efficient use as possible of transmission capacities, messages are transmitted in many communication networks in the form of data packets. For example, in a global system for mobile communication (GSM) mobile radio system messages to be transmitted are packed in data packets, so-called bursts, and subsequently transmitted via an air interface.

Use is frequently made of a multiple access method in order to be able to separate the data packets and to allocate them to a specific connection or to a corresponding subscriber. For this purpose, use is made in the GSM of a combination of time division multiple access (TDMA) and frequency division multiple access (FDMA). In FDMA, the frequency band is decomposed into a plurality of frequency channels of the same size. The frequency channels are divided into eight time slots by the time division multiple access TDMA. The eight time slots of the frequency channel are combined to form a TDMA frame, the same time slots producing a physical channel in succeeding frames.

The physical channels and/or the corresponding data packets are assigned to logic channels according to a fixed scheme. Two types are distinguished in principle as regards the logic channel: signaling channels for transmitting signaling information, and traffic channels for transmitting useful data.

In order to be able to transmit messages, in particular speech by the limited transmission capacities of an air interface as efficiently as possible, the messages which are to be transmitted are compressed before transmission by source coding and protected against channel errors by channel coding. Different methods are known in this case, particularly for speech coding. Thus, for example, in the GSM speech can be coded by a full rate speech codec, a half rate speech codec or an enhanced full rate speech codec, in which case the speech codecs or the frame conditions required for them were already known, or were to be foreseen in the standardization.

In the meantime, progress in speech coding theory has led to the development of new speech codecs that can be used for even more efficient and/or flexible transmission of speech. These are, for example, so-called adaptive multirate speech codecs whose characteristics can be matched to the transmission characteristics of the transmission channel. Within the framework of this application, a speech codec is designated as a method for encoding and/or for corresponding decoding which can also contain source and/or channel coding.

In the standardization, laying down and definition of a transmission method, in particular the GSM standard, the types of information which are transmitted by individual bit positions of a data packet, or the purpose of the information transmitted by the individual bit positions are precisely laid down so that the information can be processed and used at the receiver as intended.

SUMMARY OF THE INVENTION

It is accordingly an object of the invention to provide a method and a radio set for transmitting messages that overcome the above-mentioned disadvantages of the prior art methods and devices of this general type, which permits as efficient and flexible a utilization as possible of limited transmission capacities, in particular within an already existing and/or standardized transmission method and, if appropriate, in accordance with appropriately standardized signaling channels.

With the foregoing and other objects in view there is provided, in accordance with the invention, a method for transmitting messages. The method includes performing a transmission on a basis of data packets, a respective data packet having a plurality of bit positions assigned to different types of information. A bit group structure is produced by information type-specific combinations of the bit positions to form bit groups within the respective data packet. The data packets having identical bit group structures are allocated to different types of logic channels. A bit group of the respective data packet, which is not required for an assignment to one of the logic channels, is used for transmitting a different type of information other than a type of information specific to the bit group.

Thus, the invention is based on the idea of using bit groups of a data packet which are not required in assigning the bit groups to a specific logic channel for transmitting a type of information specific to the bit group for the purpose of transmitting a different type of information. In particular signaling information, the importance of which could not yet have been recognized when the data packets or the bit group structure thereof was being defined, or the transmission of which was not yet regarded as necessary when laying down the transmission standard.

As a result of this, it is possible to employ new technical developments for improved use of transmission capacities even after the definition of a transmission method, for example by standardization.

When introducing the invention into a transmission method in accordance with the GSM standard, the stealing flag bit group of a normal burst data packet can be used in assigning the normal burst data packet to a slow associated control channel for transmitting new signaling information, in particular for transmitting information via a speech codec used in transmitting speech data.

As a result, even recent developments and findings of information and communication technology can be used in order to fashion more efficiently and flexibly the transmission of messages using a transmission method laid down such as the GSM standard.

In accordance with an added feature of the invention, there are the steps of basing a transmission method on one of a global system for mobile communication standard and a standard derived from the global system for mobile communication; and using a stealing flag bit group of the respective data packet which is a normal burst data packet to assign the respective data packet to a slow associated control channel for transmitting the different type of information other than the type of information specific to the bit group.

In accordance with an additional feature of the invention, there is the step of using a stealing flag bit group of the respective data packet, which is a normal burst data packet, to assign the respective data packet to a slow associated control channel for transmitting signaling information via a speech codec which is applied in transmitting data over a traffic channel assigned to the slow associated control channel.

In accordance with another feature of the invention, there is the step of using an adaptive multi-rate speech codec as a speech codec for a traffic channel in addition to a half rate speech codec, a full rate speech codec, and/or an enhanced full rate speech codec.

With the foregoing and other objects in view there is further provided, in accordance with the invention, a radio set formed of a first means for transmitting messages on a basis of data packets. A respective data packet has a plurality of bit positions assigned different types of information, and a bit group structure is produced by an information type-specific combination of the bit positions to form bit groups within the respective data packet. A second means is provided for assigning the data packets having identical bit group structures to different types of logic channels. A third means is provided for using a bit group of the respective data packet, which is not required for assignment to a logic channel, for transmitting the type of information specific to it to transmit a different type of information.

In accordance with an added feature of the invention, there is provided a fourth means for transmitting messages in accordance with one of a global system for mobile communication standard and a standard derived from the global system for mobile communication standard. A fifth means is provided for using a stealing flag bit group of a respective data packet which is a normal burst data packet in assigning the respective data packet to a slow associated control channel for transmitting the different type of information than the type of information specific to it.

In accordance with a further feature of the invention, there is provided a means for using a stealing flag bit group of the respective data packet which is a normal burst data packet in assigning the respective data packet to a slow associated control channel for transmitting signaling information via a speech codec used in transmitting speech data over a traffic channel assigned to the slow associated control channel.

In accordance with a another further feature of the invention, there is provided a means for speech coding on a basis of a half rate speech codec, a full rate speech codec, an enhanced full rate speech codec, and/or an adaptive multi-rate speech codec.

With the foregoing and other objects in view there is additionally provided, in accordance with the invention, a communications system which is formed of a radio set, as defined above, and a control device assigned to the radio set for controlling a transmission of the messages.

Other features which are considered as characteristic for the invention are set forth in the appended claims.

Although the invention is illustrated and described herein as embodied in a method and a radio set for transmitting messages, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a block diagram of a radio set.

DESCRIPTION OF THE PREFERRED EMBODIMENTS

Figure 1:
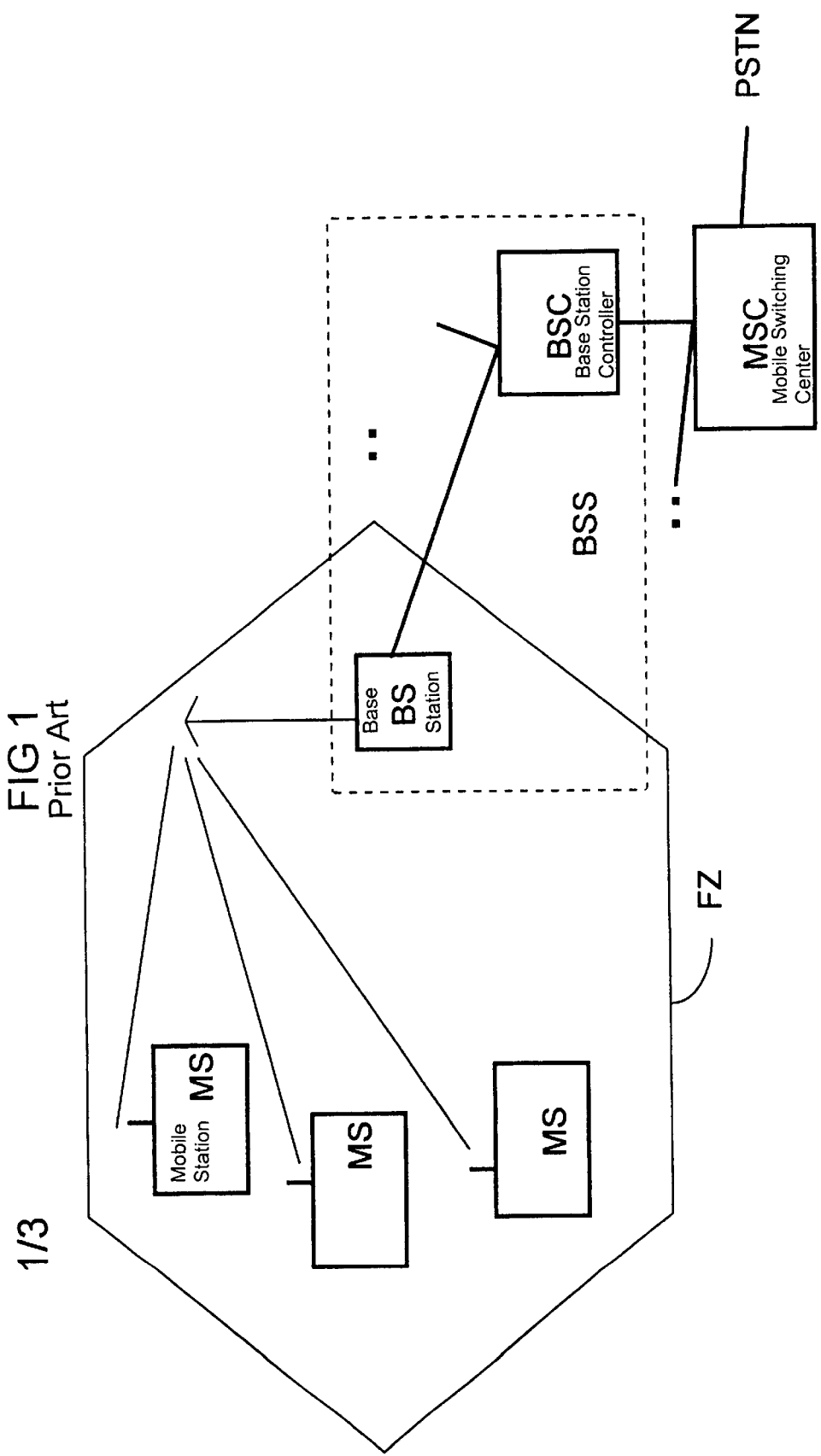
FIG. 1 is a block diagram of a mobile radio system.

In all the figures of the drawing, sub-features and integral parts that correspond to one another bear the same reference symbol in each case. Referring now to the figures of the drawing in detail and first, particularly, to FIG. 1 thereof, there is shown a mobile radio system which corresponds in structure to a known global system for mobile communication (GSM) mobile radio system. The mobile radio system contains a multiplicity of mobile switching centers MSC which are networked with one another and provide access to a fixed network PSTN. Furthermore, the mobile switching centers MSC are connected in each case to at least one base station controller BSC that can also be formed by a data processing system. Each of the base station controllers BSC is connected, in turn, to at least one base station BS. Such a base station BS is a radio set which can set up a radio link to radio sets, so-called mobile stations MS, via an air interface.

The range of the signals of the base station BS essentially defines a radio cell FZ. The allocation of resources such as frequency bands to radio cells, and thus to the data packets to be transmitted can be controlled by control devices such as, for example, the base station controllers BSC. The base stations BS and the base station controller BSC can be combined to form a base station system BSS.

The base station system BSS is also responsible in this case for radio channel administration, data rate matching, monitoring of the radio transmission path, hand-over procedures, call control and allocation and/or signaling of the speech codecs to be used, and transmits the signaling information required therefor to the mobile stations MS. The transmission of such signaling information can also be performed via signaling channels.

Different data packets are used to transmit information in the GSM. In the course of a time slot, so-called bursts (data packets) which each contain 156.25 bit positions are transmitted. A burst is a period on a frequency carrier or any frequency channel, which is modulated by a digital data packet. The burst therefore represents the physical content of a time slot.

The data packets differ from one another in this case in their bit group structure. A bit group structure is produced by the combination of bit positions within a data packet to form bit groups, the composition taking place in accordance with the type of information that is being transmitted via the respective bit positions. Each type of information corresponds in this case to a specific aim for which this information is being transmitted. Within the framework of the present application, it is also possible to distinguish between the following types of information:

a) useful information, b) signaling information, c) signaling information which is transmitted for a first application, and d) signaling information which is transmitted for a second application.

Figure 2:
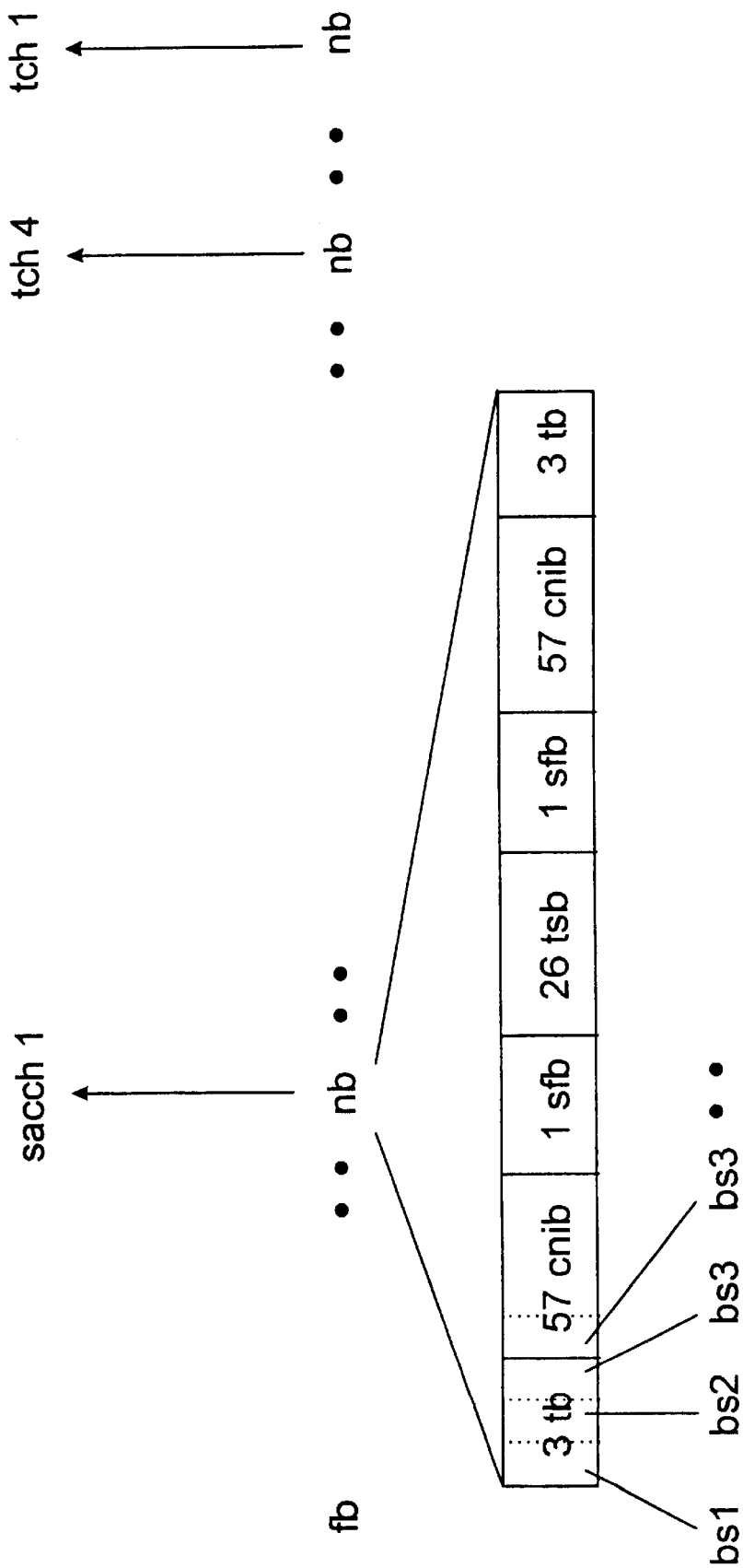
FIG. 2 is a schematic representation showing an assignment of data packets to logic channels according to the invention.

This is illustrated in FIG. 2 by way of example with the aid of a normal burst data packet nb which serves to transmit useful and signaling information by the traffic and signaling channels. Of the 148 bit positions bs (the remaining 8.25 bit positions serve as guard period), three tail bits tb are seated at the beginning and at the end. Seated in the middle is a training bit group consisting of 26 bit positions tsb which are transmitted for the purpose of synchronization and channel estimation. At each end of the training bit group tdb is a stealing flag bit group sfb being one bit each. The training bit group separates from one another two coded and mostly also encrypted useful data bit groups cnib each having 57 bit positions.

Apart from the normal burst data packet nb, a downlink (BS→MS) further includes the frequency correction burst fb, which is used for frequency synchronizing of the mobile station MS, and the synchronization burst, which transmits, inter alia, information on the temporal synchronization of the mobile station with the base station. An uplink (MS→BS) includes an access burst, which is used for a first access of the MS to the BS when there is no two-path link yet.

A distinction is made in principle between two types in the case of the logic channels: signaling channels for transmitting signaling information such as, for example, the slow associated control channel sacch i or the broadcast control channel, and traffic channels tch i for transmitting useful data.

FIG. 2 shows the assignment of various data packets fb nb to the logic channels such as the slow associated control channel sacch1 or to traffic channels tch 4, tch 1. This assignment is performed in accordance with the assignment of the physical channels to the logic channels.

Each of the traffic channels tch 1 is assigned a slow associated control channel sacch 1 by which in the downlink signaling information is transmitted for transmitter power matching, frame alignment and channel numbers of adjacent channels to be continuously observed, and in the uplink signaling information is transmitted on receiver levels (that is to say signal strength) and bit error rates (that is to say reception quality).

The normal burst data packets nb are mostly assigned to the traffic channels tch i. The stealing flag bit group sfb is used to transmit signaling information in order to indicate whether the normal burst data packet nb normally provided for transmitting useful data is being used exceptionally for urgent signaling purposes (application of the stealing flag bit group sfb) or is "stolen".

The signaling information of the slow associated control channel sacch i is also transmitted with the aid of the normal burst data packets nb. However, in the case of the control channel sacch i the exceptional use of the corresponding normal burst data packets nb is not permissible for transmitting urgent signaling information. The stealing flag big group sfb can therefore not be used in this case to transmit the type of information specific to it, and is therefore actually superfluous in this case. Consequently, in this case a "1" is transmitted in standard fashion in each case to the two bit positions sfb.

So far, a half rate (HR) speech codec, a full rate (FR) speech codec and an enhanced full rate (EFR) speech codec have been provided as speech codecs for the GSM. Appropriate signaling channels and/or bit positions have already been laid down during standardization for the purpose of transmitting signaling information via the speech codec which is to be or has been used for a connection and/or the traffic channel tch i.

In the future, the aim is also to be able to transmit messages via the GSM with the aid of new and improved speech codecs. At present, a group of novel speech codecs, so called adaptive multirate (AMR) speech codecs is being standardized at ETSI SMG11. Combined source and channel coding can also be carried out in this case.

The main aims of the AMR speech codec are to achieve fixed network quality of the speech in conjunction with different channel conditions, and to ensure optimum distribution of the channel capacity. The speech codec is to operate under good channel conditions and/or in highly utilized cells in the half rate (HR) channel. It is to be able to change with the aid of the GSM intra-cell handover into the full rate (FR) channel and back dynamically under poor channel conditions. Several code modes are available for different speech and channel coding rates within a channel mode (FR or HR), and they vary likewise in accordance with the channel quality from one to another. Consequently, the best speech quality is to be obtained taking account of the changing channel conditions.

In principle, there are two methods for transmitting this newly added signaling information for switching over between the group of the now existing speech codecs (FR, HR and EFR) and the future AMR speech codecs:

a) the in-band method by use of additional bit positions bs, which would otherwise lead to a better speech transmission; and b) the out-of-band method by use of a signaling channel.

For the purpose, in particular, of a tandem free operation (TFO), in which format conversions can be avoided in the case of transmitting speech from one GSM to another, for example via a PSTN, the aim is to signal a switchover between the group of the now existing speech codecs (FR, HR and EFR) and the future AMR speech codecs in an out-of-band fashion.

In order to be able to transmit information via a new improved speech codec which is to be, or has been used for a traffic channel tch 1, use is now made of the stealing flag bit group sfb of the normal burst data packet nb, which is assigned to the corresponding slow associated control channel sacch 1, and is therefore used for out-of-band signaling on the use of speech codecs.

In the case of the use of an AMR speech codec in the traffic channel tch 1, a "0" is transmitted in each case at the bit positions of the stealing flag bit group sfb of the corresponding slow associated control channel sacch 1, as a result of which the use the AMR speech codec is signaled. In the case of the use of the previous speech codecs (ER, HR, EFR), a "1" is transmitted in each case at the bit positions of the stealing flag bit group sfb.

In one variant of the invention, it suffices to transmit information on the fact that use is being made of a speech codec other than the ones (ER, HR, EFR) previously defined for the transmission method. Detailed information on the new speech codec can be packed by the new speech codec into the transmitted useful data, or transmitted instead of them.

In another refinement of the invention, detailed information on the new speech codec can be transmitted by specific combinations of the bit position occupancy ("0 1" or "1 0") of the stealing flag bit group sfb, or else of the stealing flag bit groups sfb of successive data packets.

In order to protect the signaling information on the use of a new speech codec against channel errors, they can additionally be channel coded. Since the switchover from one AMR speech codec to a previously known speech codec (for example EFR), or vice versa takes place only very slowly, a relatively long delay in the switchover is not a problem. Consequently, the appropriate signaling information can be transmitted by several normal burst data packets that follow one behind an another and are assigned to the control channel sacch i. For example, an affected stealing flag bit can be channel coded at a rate of ⅙, and the six code bits resulting therefrom can be transmitted in three normal burst data packets which follow one behind an another and are assigned to a slow associated control channel sacch i.

With the aid of the present description, the invention can also be used for signaling other information such as, for example, switchover information, in other transmission methods such as, for example, digital European cordless telecommunications (DECT), WB-CDMA or multimode transmission methods (GSM/WB-CDMA/TD-CDMA) and the corresponding signaling channels can be employed.

FIG. 3 shows a radio set which can be a base station BS or a mobile station MS. It contains a control device STE, a processing device VE, a power supply device SVE, a high-frequency section HF formed of a receiving device EE, a transmitting device SE and a frequency synthesizer SYN, and an antenna device ANT. The individual elements of the radio set are also interconnected by conductor tracks, cables or bus systems.

The control device STE essentially contains a program-controlled microcontroller and the processing device VE contains a digital signal processor, it being possible for both to access memory chips in a write mode and a read mode. The microcontroller controls and monitors all the essential elements and functions of the radio set, and essentially controls the communication and signaling sequence, the combination of bit positions to form bit groups, and the assignment of data packets to logic channels.

The digital signal processor, a section of the digital signal processor or a special processor is responsible for carrying out the speech coding or speech decoding. The microcontroller controls the selection of the speech codec as a function of received signaling information.

The analog audio signals and the analog signals originating from the high-frequency section HF are converted into digital signals by analog-to-digital converters, and are processed by the digital signal processor. After the combination to form data packets, the digital signals are converted again into analog audio signals by digital-to-analog converters and converted into analog signals to be fed to the high-frequency section HF. Modulation or demodulation is carried out as the case may be for this purpose.

We claim:

1. A method for transmitting messages, which comprises the steps of:
   performing a transmission on a basis of data packets, a respective data packet having a plurality of bit positions assigned to different types of information;
   producing a bit group structure by information type-specific combinations of the bit positions to form bit groups within the respective data packet;
   allocating the data packets having identical bit group structures to different types of logic channels;
   using a bit group of a data packet for transmitting a different type of information other than a type of information specific to the bit group, if the data packet is allocated to a type of logic channel where the bit group is not needed for the transmission of the type of information specific to the bit group; and
   using a stealing flag bit group of a normal burst data packet for transmitting the different type of information other than the type of information specific to the bit group, if the normal burst data packet is assigned to a slow associated control channel.

2. The method according to claim 1, which comprises using a stealing flag bit group of the respective data packet being a normal burst data packet to assign the respective data packet to a slow associated control channel for transmitting signaling information via a speech codec which is applied in transmitting data over a traffic channel assigned to the slow associated control channel.

3. The method according to claim 1, which comprises using an adaptive multirate speech codec as a speech codec for a traffic channel in addition to at least one of a half rate speech codec, a full rate speech codec, and an enhanced full rate speech codec.

4. A radio set, comprising:
   first means for transmitting messages on a basis of data packets, a respective data packet having a plurality of bit positions assigned different types of information, and a bit group structure being produced by an information type-specific combination of the bit positions to form bit groups within the respective data packet;
   second means for assigning the data packets having identical bit group structures to different types of logic channels;
   third means for using a bit group of a data packet for transmitting a different type of information other than a type of information specific to the bit group, if the data packet is allocated to a type of logic channel where the bit group is not needed for the transmission of the type of information specific to the bit group;
   fourth means for transmitting messages; and
   fifth means for using a stealing flag bit group of a normal burst data packet for transmitting the different type of information other than the type of information specific to the bit group, if the normal burst data packet is assigned to a slow associated control channel.

5. The radio set according to claim 4, including fourth means for using a stealing flag bit group of the respective data packet being a normal burst data packet in assigning the respective data packet to a slow associated control channel for transmitting signaling information via a speech codec used in transmitting speech data over a traffic channel assigned to the slow associated control channel.

6. The radio set according to claim 4, including fourth means for speech coding on a basis of one of a half rate speech codec, a full rate speech codec, an enhanced full rate speech codec, and an adaptive multirate speech codec.

7. A communications system, comprising:
   a radio set, including:
       first means for transmitting messages on a basis of data packets, a respective data packet having a plurality of bit positions assigned different types of information, and a bit group structure being produced by an information type-specific combination of the bit positions to form bit groups within the respective data packet;
       second means for assigning the data packets having identical bit group structures to different types of logic channels;
       third means for using a bit group of a data packet for transmitting a different type of information other than a type of information specific to the bit group, if the data packet is allocated to a type of logic channel where the bit group is not needed for the transmission of the type of information specific to the bit group;

fourth means for transmitting messages; and fifth means for using a stealing flag bit group of a normal burst data packet for transmitting the different type of information other than the type of information specific to the bit group, if the normal burst data packet is assigned to a slow associated control channel; and a control device assigned to said radio set for controlling a transmission of the messages.

\* \* \* \* \*